July 29, 1969

G. W. NICHOLS 3,458,707

MASK FOR FLAW DETECTOR WHICH PREVENTS END
OF MATERIAL FROM BEING CONFUSED WITH FLAW

Filed Jan. 16, 1968

INVENTOR.
Gordon W. Nichols

BY

ATTORNEY

United States Patent Office 3,458,707
Patented July 29, 1969

3,458,707
MASK FOR FLOW DETECTOR WHICH PREVENTS END OF MATERIAL FROM BEING CONFUSED WITH FLAW
Gordon W. Nichols, Binghamton, N.Y., assignor to GAF Corporation, New York, N.Y., a corporation of Delaware
Filed Jan. 16, 1968, Ser. No. 698,177
Int. Cl. G01n 21/30
U.S. Cl. 250—219     6 Claims

ABSTRACT OF THE DISCLOSURE

A mask is interposed in the path of a laser beam, reflected from film to be tested, which mask is adjusted to match the width of the film, so that the beam, de-collimated by the edges, will give an output signal of a frequency at least half of a defect signal, which frequency is filtered out from wanted defect signals by a filter circuit.

---

The present invention relates to film testing apparatus and more particularly to apparatus to test film which is essentially red-blind such as photographic paper, X-ray film, and other photographic products.

Testing the continuity of photographic products for defects, it has been found that a laser beam, for example as generated by a helium-neon laser and having a wave length of 6328 A. is particularly useful. The intensity of such a beam is high so that it can be scanned rapidly, over a wide web of film, but because of the single wave length characteristic of laser beams, fogging of the film is essentially eliminated.

In the testing of films by means of a beam of radiation, and more particularly, as herein proposed by laser beam, it has already been the practice to scan the beam across the film. The film is usually wound over a testing roller or drum and the beam is directed thereunto; the film runs over the drum, and the beam is scanned transversely with respect thereto. A reflected beam is then picked up and directed to a light-sensitive transducer, such as a photomultiplier tube or other radiation-sensitive element. If a film defect is sensed, a sharp pulse will be obtained from electronic pulse shaping circuitry connected to the light-sensitive element. This sharp pulse can then be utilized to energize an alarm system, a recorder or the like.

When a sharply collimated high intensity beam, such as a laser beam is used, it has been found that the edges of the film running over the roller supply output signals from the radiation-sensitive element which appear to be similar to film defects. Elimination of these output signals is difficult, and discrimination from unwanted defect signals also has proved troublesome. One solution has been to provide electronic blanking or blocking circuitry, electronically disabling output signals from being recorded. Such blanking or blocking circuitry, when controlled by a mechanical scanning mechanism, has the disadvantage that the point at which the blocking must cease, corresponding to a point just beyond the edge of the film, is difficult to keep in adjustment. Further, if the film wanders laterally over the testing drum or roller, defect signals which should be recorded may be blanked, or edge signals may arise, giving a spurious indication of defects. Another proposal, to get rid of unwanted edge signals, was to differentiate all sharply appearing spikes and, from the resulting differentiated wave shape, discriminating by wave shape matching and frequency analyses from true defect signals. This requires complicated electronic circuitry and it has been found, in actual practice, that effectively eliminating film edge signals at times also eliminated wanted defect signals.

The characteristics of the laster beam, sharply collimated fine beams having a spot diameter of about 2 mm. at a single wave length, permits a different approach. When a beam is generated from an incandescent light source, and shaped into a collimated pencil-like beam by means of lenses, stray radiation is unavoidable. The laser beam, however, retains its collimated characteristic until it strikes a surface which is not perfectly reflective. When the collimated laser beam strikes the film it tends to de-collimate.

A decollimated beam, as picked up on the photomultiplier tube, or reflected by a reflecting mirror, will no longer have the small spot size of the original beam but rather form a larger circle thereon.

Briefly, in accordance with the present invention, and in order to eliminate unwanted edge signals, a mask is used masking the ends of the travel of the scanning beam, by being either applied to a reflecting mirror or to the photomultiplier tube face directly, in combination with an electronic filtering circuit which filters out the partly masked off edge signals. The frequency of the signal generated by the end blindness is less than half the frequency of a defect signal, and this substantial difference in frequency can readily be distinguished electrically by filter circuits.

Different widths of films can readily be accommodated by either having masks of different sizes, or by adjusting the coverage of a mask over the reflecting mirror, or over the face of the photomultiplier tube, so that different width films can readily be tested by simply adjusting the mask.

Accordingly, it is a primary object of the present invention to provide an improved film testing apparatus, particularly suitable for wide film.

It is another object of the present invention to provide a film testing apparatus which can readily accommodate different widths of film.

It is still another object of the present invention to provide a film testing apparatus which can operate with a high concentration of light in the red region to test red-blind products, and which provides outputs readily distinguishing between film defects and film edges.

It is a further object of the invention to provide a film testing apparatus which requires only simple and inexpensive electronic circuitry and which is readily manually adjustable.

It is a further object of the present invention to provide a versatile apparatus to test wide webs of red-blind photographic products without causing fogging thereof.

These and other objects and many of the attendant advantages of this invention will be readily appreciated as the same becomes better understood by reference to the following detailed description when considered in connection with the accompanying drawings, in which.

Figure 1:
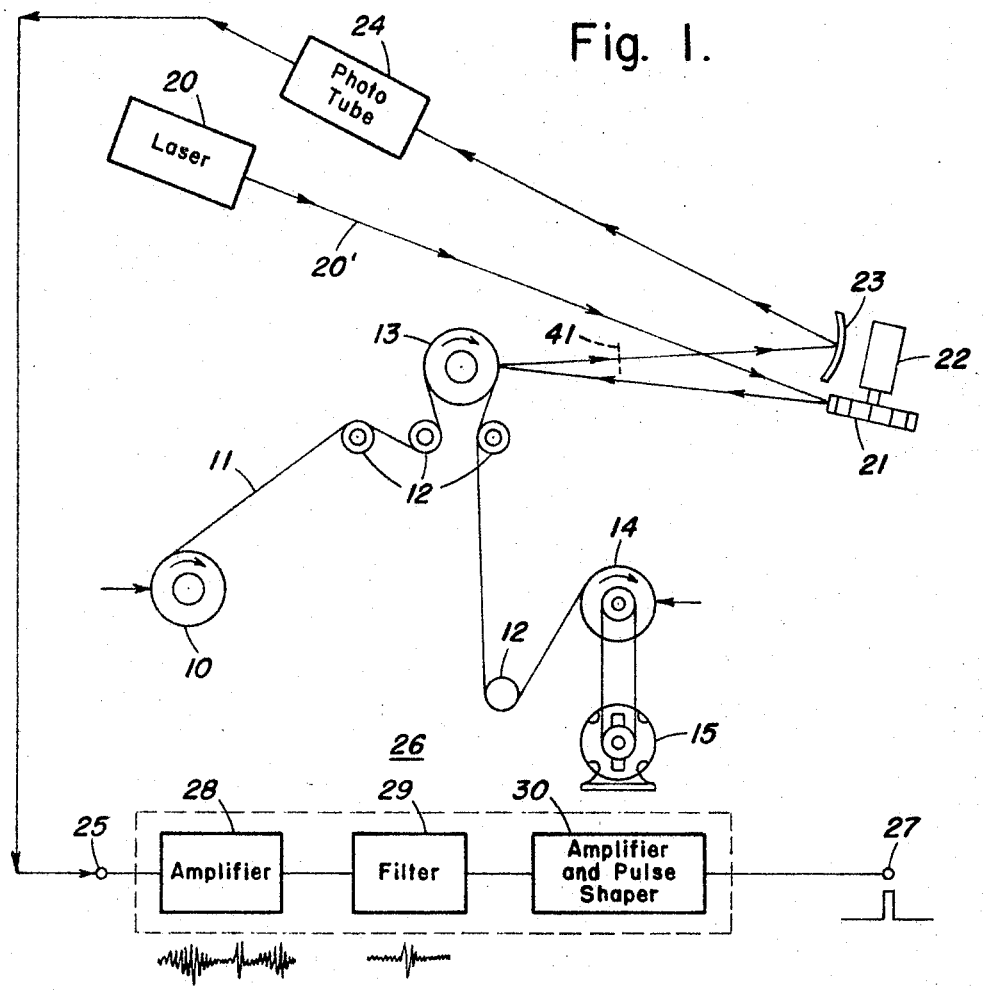
FIG. 1 is a schematic diagram of the film testing apparatus of the present invention.

Referring now particularly to the drawings, wherein like reference characters designate like or corresponding parts throughout the view, FIG. 1 illustrates the apparatus in general form. A film supplier reel 10 supplied a web of film 11 traveling over idler rollers 12 to a testing or scanning drum 13. The film is looped over drum 13 and then wound up at a film wind-up, or take-up roller 14 driven by a motor 15 in conventional form. A neon-helium laser 20 generates a narrow beam of 20′ of collimated light at a wavelength of about 6328 A. which beam 20′ may have an average dimeter of about 2 mm. Beam 20' is directed to a 12-sided mirror 21, rotated by a motor 22 to scan the laser beam 20' over the film 11 wound around scanning drum 13. The beam 20', reflected from the film, is picked up by a spherical mirror 23, from where the beam is reflected to the face of a photomultiplier pick-up tube 24. By roating the mirror 21 at high speed, for example, at 3600 r.p.m., a film scanning rate of 43,200 scans per minute can be obtained. The output from photomultiplier tube 24 is applied to a terminal 25, to be processed by an electronic unit generally illustrated at 26. The output from unit 26 is available at terminal 27 to actuate an alarm device, a recorder, or other equipment which is to indicate a defect.

The electronic unit 26 includes an amplifier 28, connected to a filter 29, and in turn connected to an amplifier and pulse shaper 30, which supplies output 27. The wave forms appearing at the various elements of electronic circuit 26 are indicated therebeneath where necessary to an understanding of the invention.

When the laser beam is scanned over the width of the web 11, it is decollimated by the discontinuity caused by the film running over the roller. The roller 13 preferably is black, and of sufficient width to accommodate the widest material to be tested. Defects in the products to be tested, such as physical discontinuities, loss of emulsion and thus change in reflectivity, tears and scratches will appear as pulses at the output of the photomultiplier tube 25. Additionally, such defects will cause decollimation of the beam. The beam 20' is generally circular. Where it decollimates, the circle is greater. Defects in the film are usually abrupt and sharp, causing sharp pulses, one pulse where the spot strikes the defect and another pulse where the spot goes back from the defect to the remainder of the material as it scans across. These pulses will have a certain frequency determined in part by the scanning rate, governed by the speed of mirror 21, and will be sharp pips.

In accordance with the present invention, a mask is interposed in the path of the beam 20' to mask the edges and cause decollimation of the beam at a frequency which is different from the frequency of the signal due to defects. The mask is arranged in such a way that the output from the photomultiplier tube, at the edge of the film, will be a sine wave. Filter 29 in electronic circuitry 26 is then so adjusted that this sine wave can be filtered out.

Figure 2:
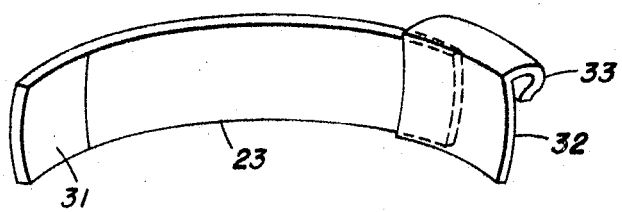
FIG. 2 is a perspective view of a reflecting mirror, illustrating a masking arrangement.

Referring to FIG. 2, mirror 23 has its end surfaces masked off, as seen at 31 on the left side. An adjustable mask is illustrated at 32 at the right side of FIG. 2. This mask may be any material which does not reflect the laser beam and is slidably arranged, for example by having a clamping extension 33 over the mirror 23. Adjustment of the mask 32 can be made to match the width of films 11 to be tested as they pass over roller 13.

Mask 31, 32 causes the beam to go out of focus, so that cut-off of the beam as it leaves the scanning area of the film, and would pass over the drum, is spread out. Thus, the rise time of the light difference, that is the rate of change of light is less than that which would occur at a defect and filter 29 is then designed as a low pass filter to filter out slow variations in light intensity, as seen by the waves beneath element 28 and element 29 and pass only high frequency sharply peaked components. Amplifier 30 is then arranged to have pulse shaping circuitry included therein to provide square pulses to actuate alarm signals as indicated beneath terminal 27.

Figure 3:
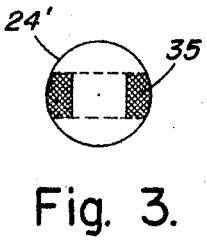
FIG. 3 is a face masking arrangement for a photomultiplier tube.
Figure 4:
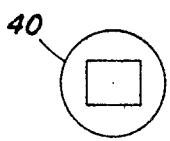
FIG. 4 is a separate masking element.

Arrangements of the mask 32 to match film width is readily accomplished, and the system as a whole is independent of the width of the web 11 to be tested. Rather than masking part of the reflective mirror, a mask 35 can be placed over the face 24' of photomultiplier tube 24, as seen in FIG. 3. Alternatively, a mask 40 (FIG. 4) can be snapped over the face of the photomultiplier tube, or located anywhere in the path of the beam 20', for example at location 41, indicated in dotted lines in FIG. 1. For a laser beam of about 2 mm. spot size, a spacing of location 41 from the detection side of the film of about 4 inches has been found suitable.

It should also be understood that the foregoing relates to only a preferred embodiment of the invention, and that it is intended to cover all changes and modifications of the example of the invention herein chosen for the purposes of the disclosure, which do not constitute departures from the spirit and scope of the invention.

What is claimed is:

1. Film testing apparatus to test a web of film comprising:
    a laser generating a collimated beam of light and directing said beam towards said web of film;
    means scanning said beam over said web;
    photoelectric transducer means located in the path of said beam after having impinged on said web and providing an output signal in accordance with the intensity of the received beam;
    an electrical output circuit connected to said transducer means and providing an output upon change of light intensity on said transducer means;
    masking means located in the path of the beam and blocking impingement of said beam on said transducer means when the beam is scanning in the region beyond said film; and
    filter means in the electrical output circuit filtering low frequency components generated by said beams at the edges of the film upon transition of the beam from the masking means to the film and back again to the masking means.

2. Apparatus as defined in claim 1, wherein said beam is directed towards said film and reflected therefrom;
    a spherical mirror is interposed in the path between said film and said transducer; and
    masking means are applied to said mirror.

3. Apparatus as defined in claim 2, wherein said masking means includes an element slidable on said mirror and blocking reflections therefrom.

4. Apparatus as defined in claim 1, wherein said transducer has a tube face and said masking means is a mask applied to the face of the tube.

5. Apparatus as defined in claim 1, wherein said masking means is a mask interposed in the optical path of said beam between the film and said transducer.

6. Apparatus as defined in claim 1, wherein said filter has a band path characteristic to cut off sinusoidal waves of a frequency which is half, or less, of signals obtained from defects in the film to be tested.

References Cited

UNITED STATES PATENTS 3,061,731    10/1962    Thier et al. _____ 250—219

ARCHIE R. BORCHELT, Primary Examiner

MARTIN ABRAMSON, Assistant Examiner

U.S. Cl. X.R.

250—237